United States Patent
Hu et al.

(10) Patent No.: US 11,899,168 B2
(45) Date of Patent: Feb. 13, 2024

(54) OPTICAL IMAGING LENS ASSEMBLY

(71) Applicant: ZHEJIANG SUNNY OPTICS CO., LTD., Yuyao (CN)

(72) Inventors: Yabin Hu, Yuyao (CN); Fujian Dai, Yuyao (CN); Liefeng Zhao, Yuyao (CN)

(73) Assignee: ZHEJIANG SUNNY OPTICS CO., LTD., Yuyao (CN)

( * ) Notice: Subject to any disclaimer, the term of this patent is extended or adjusted under 35 U.S.C. 154(b) by 337 days.

(21) Appl. No.: 17/206,750

(22) Filed: Mar. 19, 2021

(65) Prior Publication Data

US 2021/0208368 A1     Jul. 8, 2021

Related U.S. Application Data

(63) Continuation of application No. PCT/CN2020/082986, filed on Apr. 2, 2020.

(30) Foreign Application Priority Data

May 27, 2019    (CN) .......................... 201910444529.5

(51) Int. Cl.
    *G02B 13/00*      (2006.01)
    *G02B 9/12*      (2006.01)

(52) U.S. Cl.
    CPC ............ *G02B 13/0035* (2013.01); *G02B 9/12* (2013.01)

(58) Field of Classification Search
    CPC ...... G02B 13/0035; G02B 9/12; G02B 13/02; G02B 13/18

USPC .................................................. 359/784, 791
See application file for complete search history.

(56) References Cited

U.S. PATENT DOCUMENTS

| | | | | |
|---|---|---|---|---|
| 7,636,207 | B2* | 12/2009 | Hsu ........................ | G02B 13/22 |
| | | | | 359/791 |
| 8,558,939 | B2* | 10/2013 | Matsui ............... | G02B 13/0035 |
| | | | | 359/716 |
| 9,274,310 | B1* | 3/2016 | Chung ............... | G02B 13/0035 |
| 9,759,889 | B1 | 9/2017 | Tang et al. | |
| 2011/0194013 | A1 | 8/2011 | Tang et al. | |

(Continued)

FOREIGN PATENT DOCUMENTS

| CN | 85109241 A | 7/1986 |
|---|---|---|
| CN | 103403601 A | 11/2013 |

(Continued)

OTHER PUBLICATIONS

Gross et al.; Handbook of Optical Systems, 2007, Wiley; vol. 3. (Year: 2007).*

(Continued)

*Primary Examiner* — Alicia M Harrington
(74) *Attorney, Agent, or Firm* — Sughrue Mion, PLLC

(57) ABSTRACT

The present disclosure provides an optical imaging lens assembly including, sequentially from an object side to an image side along an optical axis, a first lens having positive refractive power; a second lens having positive refractive power and a convex object-side surface; and a third lens having negative refractive power. A distance TTL along the optical axis from an object-side surface of the first lens to an imaging plane of the optical imaging lens assembly and half of a diagonal length ImgH of an effective pixel area on the imaging plane satisfy 2.0<TTL/ImgH<2.5.

18 Claims, 9 Drawing Sheets

(56) References Cited

U.S. PATENT DOCUMENTS

| | | | | |
|---|---|---|---|---|
| 2012/0293874 A1* | 11/2012 | Matsui | ............... | G02B 13/0035 |
| | | | | 359/708 |
| 2013/0301145 A1* | 11/2013 | Tsai | ....................... | G02B 13/18 |
| | | | | 359/716 |
| 2015/0029602 A1* | 1/2015 | Kubota | .............. | G02B 13/0035 |
| | | | | 359/791 |
| 2016/0116713 A1 | 4/2016 | Hsu et al. | | |

FOREIGN PATENT DOCUMENTS

| | | |
|---|---|---|
| CN | 103424844 A | 12/2013 |
| CN | 110007445 A | 7/2019 |
| CN | 210015281 U | 2/2020 |
| JP | 2005-250512 A | 9/2005 |
| JP | 2008-275831 A | 11/2008 |
| JP | 2009-223251 A | 10/2009 |

OTHER PUBLICATIONS

Office Action dated Feb. 3, 2022 in Indian Application No. 202117013197.
International Search Report for PCT/CN2020/082986, dated Jun. 28, 2020.

\* cited by examiner

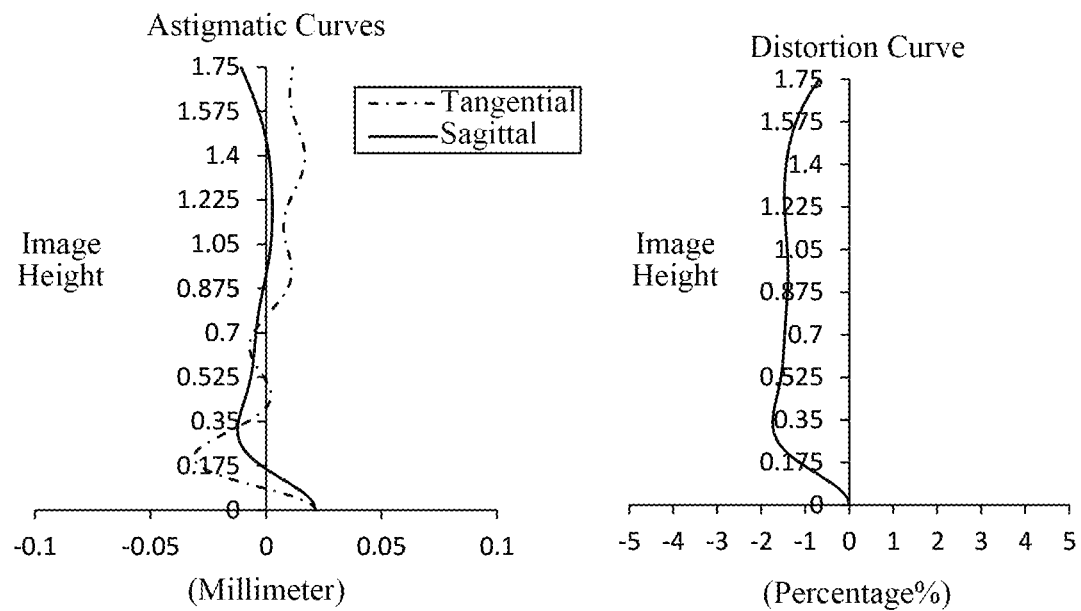
Fig. 6C
Fig. 6D
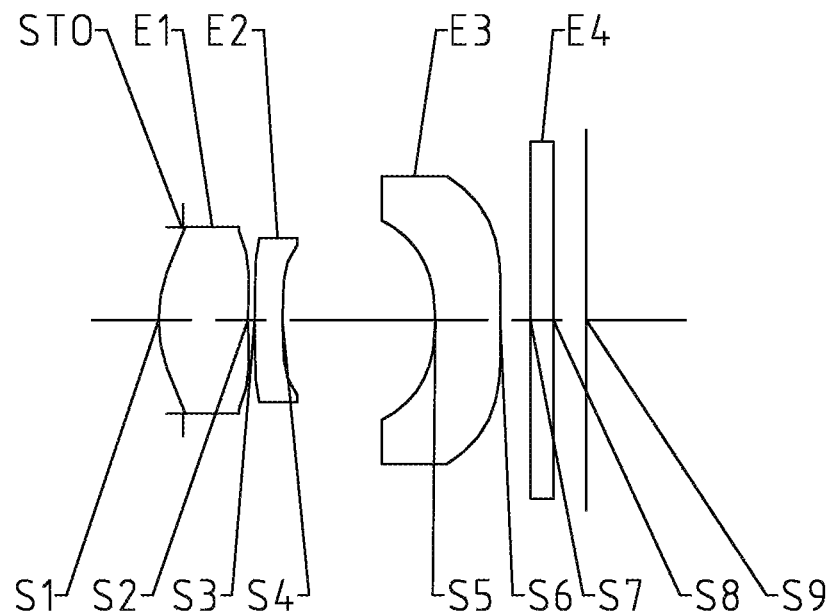
Fig. 7

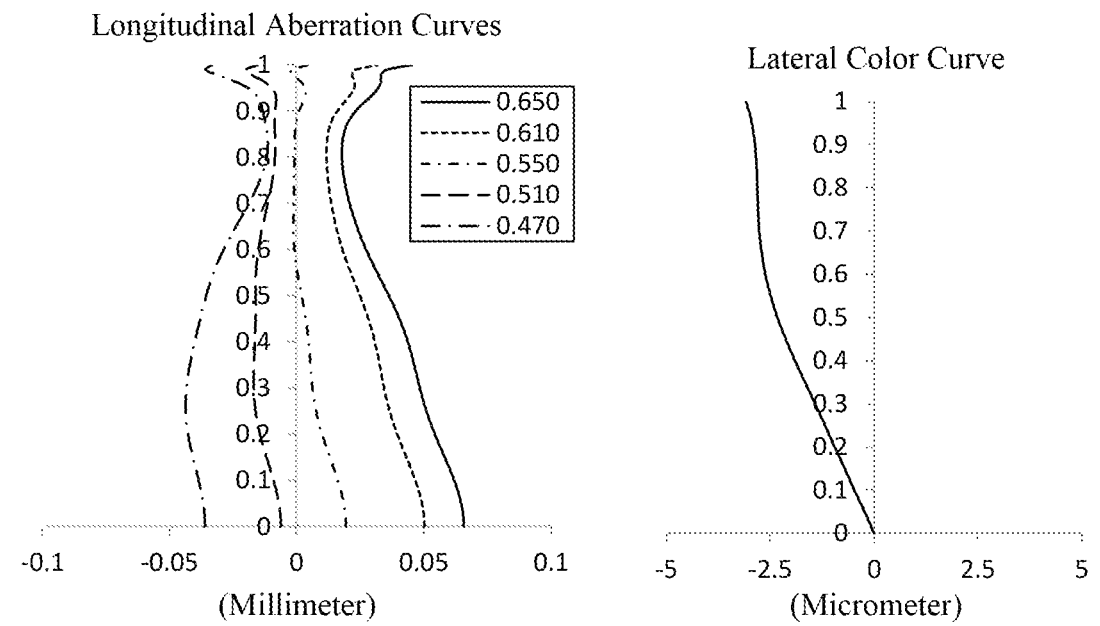
Fig. 8A
Fig. 8B
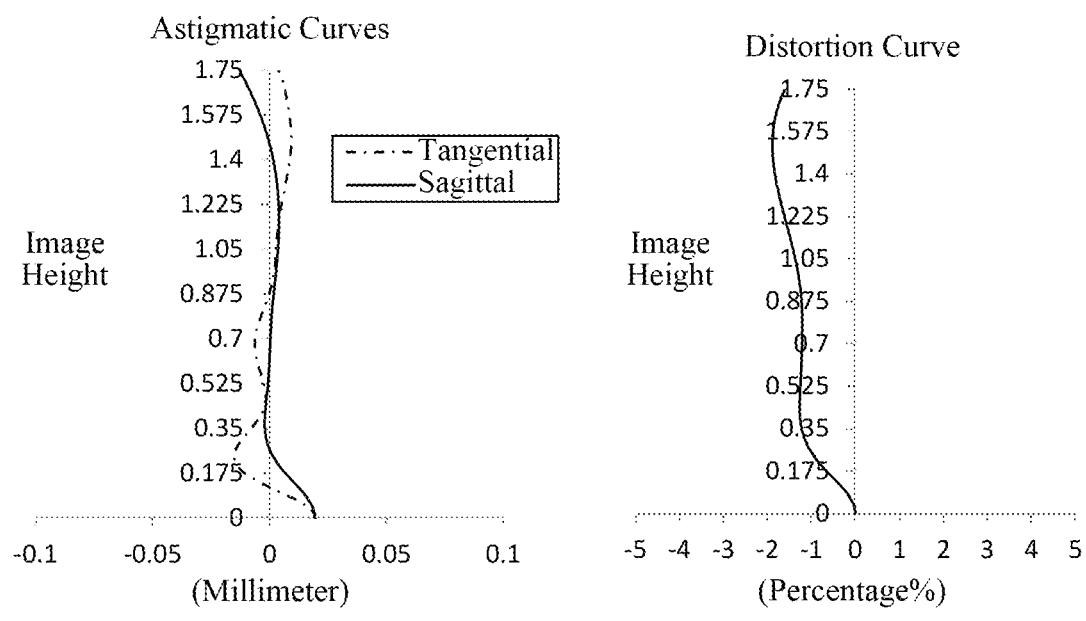
Fig. 8C
Fig. 8D

OPTICAL IMAGING LENS ASSEMBLY

CROSS-REFERENCE TO RELATED APPLICATION

The present patent application is a continuation of International Application No. PCT/CN2020/082986, filed on Apr. 2, 2020, which claims priority to Chinese Patent Application No. 201910444529.5, filed before the China National Intellectual Property Administration (CNIPA) on May 27, 2019. Both of the aforementioned patent applications are hereby incorporated by reference in their entireties.

TECHNICAL FIELD

The present disclosure relates to an optical imaging lens assembly, and specifically, relates to an optical imaging lens assembly including three lenses.

BACKGROUND

At present, the requirements for imaging functions of portable electronic devices are getting higher and higher. Generally, the portable electronic devices combine image processing algorithms to process images. However, since the optical characteristics of the optical imaging lens assembly directly affect the image quality of the initial image, it is necessary for the optical imaging lens assembly applicable to the portable electronic device to have high performance.

For example, the mobile phone industry tends to use multiple optical imaging lens assemblies for multi-shot, and the multiple optical imaging assemblies own different optical characteristics. Generally, the multiple optical imaging lens assemblies include one optical imaging lens assembly with long focal length, and then combined with image processing algorithms to achieve optical zoom. However, since the size of the portable electronic device is expected to be as small as possible, the optical imaging lens assembly provided thereon usually has a short focal length, a small magnification, inconvenient production and manufacturing, and poor image quality.

SUMMARY

The present disclosure provides an optical imaging lens assembly, such as a telephoto optical imaging lens assembly, that may at least solve or partially solve at least one of the above disadvantages of the prior art.

According to one embodiment of the present disclosure, an optical imaging lens assembly is provided. The optical imaging lens assembly may include, sequentially from an object side to an image side along an optical axis, a first lens having positive refractive power; a second lens having positive refractive power and a convex object-side surface; and a third lens having negative refractive power. A distance TTL along the optical axis from an object-side surface of the first lens to an imaging plane of the optical imaging lens assembly and half of a diagonal length ImgH of an effective pixel area on the imaging plane satisfy 2.0<TTL/ImgH<2.5.

According to the embodiment of the present disclosure, the object-side surface of the first lens may be convex, and an image-side surface of the first lens may be concave.

According to the embodiment of the present disclosure, the distance TTL along the optical axis from the object-side surface of the first lens to the imaging plane of the optical imaging lens assembly and an effective focal length f of the optical imaging lens assembly may satisfy TTL/f<1.0.

According to the embodiment of the present disclosure, half of a maximum field-of-view Semi-FOV of the optical imaging lens assembly may satisfy Semi-FOV>20°.

According to the embodiment of the present disclosure, an effective focal length f of the optical imaging lens assembly and an entrance pupil diameter EPD of the optical imaging lens assembly may satisfy f/EPD<2.6.

According to the embodiment of the present disclosure, an effective focal length f1 of the first lens and an absolute value |f3| of an effective focal length of the third lens may satisfy 1.0<f1/|f3|<1.5.

According to the embodiment of the present disclosure, a radius of curvature R2 of an image-side surface of the first lens and a radius of curvature R1 of the object-side surface of the first lens may satisfy 2.5<R2/R1<3.5.

According to the embodiment of the present disclosure, SAG11, being a distance along the optical axis from an intersection of the object-side surface of the first lens and the optical axis to a vertex of an effective radius of the object-side surface of the first lens, and SAG22, being a distance along the optical axis from an intersection of an image-side surface of the second lens and the optical axis to a vertex of an effective radius of the image-side surface of the second lens, may satisfy 1.5<SAG11/SAG22<3.0.

According to the embodiment of the present disclosure, an edge thickness ET2 of the second lens and a center thickness CT2 of the second lens along the optical axis may satisfy 1.0<ET2/CT2<1.5.

According to the embodiment of the present disclosure, a center thickness CT1 of the first lens along the optical axis and a center thickness CT2 of the second lens along the optical axis may satisfy 2.0<CT1/CT2<3.5.

According to the embodiment of the present disclosure, a center thickness CT1 of the first lens along the optical axis, a center thickness CT2 of the second lens along the optical axis, a center thickness CT3 of the third lens along the optical axis and a spaced interval T23 between the second lens and the third lens along the optical axis may satisfy 0.5<(CT1+CT2+CT3)/T23<1.5.

The present disclosure provides an optical imaging lens assembly that includes a plurality of (for example, three) lenses. The above optical imaging lens assembly has the beneficial effects of miniaturization and high image quality, by rationally configuring the refractive power, the surface shape, the center thickness of each lens, and the on-axis spaced interval between the lenses and the like. In addition, each lens and the photosensitive elements arranged at the imaging plane usually have installation tolerances. The ratio of the distance TTL along the optical axis from the object-side surface of the first lens to the imaging plane to half of the diagonal length ImgH of the effective pixel area on the imaging plane is between 2.0 and 2.5, so that the deflection angle of the light after passing through the optical imaging lens assembly is small, and the tolerance sensitivity of the optical imaging lens assembly may be reduced, thereby further improving the image quality.

BRIEF DESCRIPTION OF THE DRAWINGS

The above and other advantages of the embodiments of the present disclosure will become apparent through the detailed description with reference to the following drawings, which are intended to illustrate the exemplary embodiments of the present disclosure rather than limit them. In the drawings:

FIGS. 6A to 6D illustrate longitudinal aberration curves, a lateral color curve, astigmatic curves and a distortion curve according to example 3 of the present disclosure, respectively;

FIG. 7 illustrates a schematic structural view of an optical imaging lens assembly according to example 4 of the present disclosure;

FIGS. 8A to 8D illustrate longitudinal aberration curves, a lateral color curve, astigmatic curves and a distortion curve according to example 4 of the present disclosure, respectively;

DETAILED DESCRIPTION OF EMBODIMENTS

Figure 1:
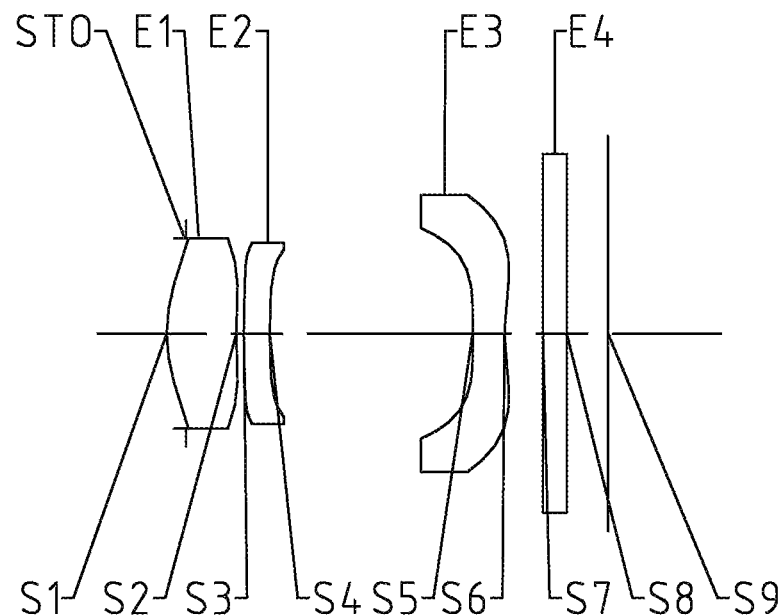
FIG. 1 illustrates a schematic structural view of an optical imaging lens assembly according to example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens of the optical imaging lens assembly discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is convex and the position of the convex is not defined, it indicates that the surface of the lens is convex at least in the paraxial region; and if a surface of a lens is concave and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

Herein, we define the direction parallel to the optical axis as a Z-axis direction, the direction perpendicular to the Z-axis and located in the tangential plane as a Y-axis direction, and the direction perpendicular to the Z-axis and located in the sagittal plane as an X-axis direction. In the present disclosure, unless otherwise specified, all the parameters (for example, the radius of curvature, etc.) other than the parameters related to the field-of-view represent the parameter values of the features along the Y-axis direction of the camera lens group. For example, unless otherwise specified, the conditional expression 2.5<R2/R1<3.5 represents the ratio of the radius of curvature R2Y in the Y-axis direction of the image-side surface of the first lens to the radius of curvature R1Y of the object-side surface of the first lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging lens assembly according to an exemplary embodiment of the present disclosure may include a first lens, a second lens, and a third lens. The three lenses are arranged sequentially from an object side to an image side along an optical axis, and there may be an air interval between each two adjacent lenses.

In an exemplary embodiment, the first lens may have positive refractive power; the second lens may have positive refractive power and an object-side surface thereof may be convex; and the third lens may have negative refractive power. By rationally configuring the refractive power of the lenses, the off-axis aberration of the optical imaging lens assembly is corrected, thereby improving the image quality.

In an exemplary embodiment, the optical imaging lens assembly according to the present disclosure may satisfy: 2.0<TTL/ImgH<2.5, where TTL is a distance along the optical axis from an object-side surface of the first lens to an imaging plane of the optical imaging lens assembly, and ImgH is half of a diagonal length of an effective pixel area on the imaging plane. As an example, TTL and ImgH satisfy the conditional expression 2.18<TTL/ImgH<2.5, for example, 2.18<TTL/ImgH<2.28. Satisfying the conditional expression 2.0<TTL/ImgH<2.5 may reduce the tolerance sensitivity of the optical imaging lens assembly, thereby further improving the image quality.

According to the embodiment of the present disclosure, an object-side surface of the first lens may be convex, and an image-side surface of the first lens may be concave.

According to the embodiment of the present disclosure, the optical imaging lens assembly according to the present disclosure may satisfy: TTL/f<1.0, where TTL is a distance along the optical axis from an object-side surface of the first lens to an imaging plane of the optical imaging lens assembly, and f is an effective focal length of the optical imaging lens assembly. As an example, TTL and f may satisfy TTL/f<0.95, for example, 0.9<TTL/f<0.95. By setting the distance TTL along the optical axis from the object-side surface of the first lens to the imaging plane to be smaller than the effective focal length f of the optical imaging lens assembly, the optical imaging lens assembly has a smaller size, especially a shorter length, and the optical imaging lens assembly has the characteristics of large magnification and small depth of field.

According to the embodiment of the present disclosure, the optical imaging lens assembly according to the present disclosure may satisfy: Semi-FOV>20°, where Semi-FOV is half of a maximum field-of-view of the optical imaging lens assembly. As an example, Semi-FOV may satisfy 20°<Semi-FOV<30°, for example, 20°<Semi-FOV<25°. By controlling the full field-of-view of the optical imaging lens assembly, the light beam from the object space may form a good image on the chip arranged at the imaging plane.

According to the embodiment of the present disclosure, the optical imaging lens assembly according to the present disclosure may satisfy: f/EPD<2.6, where f is an effective focal length of the optical imaging lens assembly, and EPD is an entrance pupil diameter of the optical imaging lens assembly. As an example, f and EPD may satisfy f/EPD<2.58, for example, 2.5<f/EPD<2.58. By controlling the ratio of the effective focal length f of the optical imaging lens assembly to the entrance pupil diameter EPD of the optical imaging lens assembly, the optical imaging lens assembly may have a sufficient amount of light and a higher signal-to-noise ratio.

According to the embodiment of the present disclosure, the optical imaging lens assembly according to the present disclosure may satisfy: 1.0<f1/|f3|<1.5, where f1 is an effective focal length of the first lens, and |f3| is an absolute value of an effective focal length of the third lens. As an example, f1 and |f3| may satisfy 1.1<f1/|f3|<1.5. In the optical imaging lens assembly, light beams converge at the first lens having positive refractive power, and then diverge at the third lens having negative refractive power. By controlling the ratio of the effective focal length f1 of the first lens to the absolute value |f3| of the effective focal length of the third lens, the effective focal length of the optical imaging lens assembly may be increased. At the same time, the two lenses may correct the curvature of field, so that the imaging effect is good.

According to the embodiment of the present disclosure, the optical imaging lens assembly according to the present disclosure may satisfy: 2.5<R2/R1<3.5, where R2 is a radius of curvature of an image-side surface of the first lens, and R1 is a radius of curvature of an object-side surface of the first lens. As an example, the optical imaging lens assembly may satisfy 2.5<R2/R1<3.2, for example, 2.6<R2/R1<3.2. By controlling the ratio of the radius of curvature of the image-side surface of the first lens to the radius of curvature of the object-side surface of the first lens, the range of the positive refractive power of the first lens may be controlled, and the astigmatic in the tangential direction and the off-axis coma may be corrected.

According to the embodiment of the present disclosure, the optical imaging lens assembly according to the present disclosure may satisfy: 1.5<SAG11/SAG22<3.0, where SAG11 is a distance along the optical axis from an intersection of an object-side surface of the first lens and the optical axis to a vertex of an effective radius of the object-side surface of the first lens, and SAG22 is a distance along the optical axis from an intersection of an image-side surface of the second lens and the optical axis to a vertex of an effective radius of the image-side surface of the second lens. As an example, the optical imaging lens assembly of the present disclosure may satisfy 1.5<SAG11/SAG22<2.8, for example, 1.55<SAG11/SAG22<2.7. By controlling the ratio of SAG11 to SAG22, the shapes of the object-side surface of the first lens and the image-side surface of the second lens and differences between the two surfaces may be controlled, so that the intensity of the ghost image generated by the reflection of light on the two surfaces is weaker.

According to the embodiment of the present disclosure, the optical imaging lens assembly according to the present disclosure may satisfy: 1.0<ET2/CT2<1.5, where ET2 is an edge thickness of the second lens, and CT2 is a center thickness of the second lens along the optical axis. As an example, the optical imaging lens assembly of the present disclosure may satisfy the conditional expression 1.0<ET2/CT2<1.5, for example, 1.1<ET2/CT2<1.4. By controlling the center thickness and edge thickness of the second lens, the shape of the second lens may be controlled, so that the second lens has better manufacturing processability. At the same time, the second lens may correct sagittal astigmatic and Petzval field curvature.

According to the embodiment of the present disclosure, the optical imaging lens assembly according to the present disclosure may satisfy: 2.0<CT1/CT2<3.5, where CT1 is a center thickness of the first lens along the optical axis, and CT2 is a center thickness of the second lens along the optical axis. As an example, the optical imaging lens assembly of the present disclosure may satisfy the conditional expression 2.2<CT1/CT2<3.4, for example, 2.4<CT1/CT2<3.3. By controlling the ratio of the center thickness of the first lens to the center thickness of the second lens, the refractive power of the first lens and the second lens may be controlled. While ensuring the total optical length of the optical imaging lens assembly, the molding process of each lens meets the manufacturing process requirements.

According to the embodiment of the present disclosure, the optical imaging lens assembly according to the present disclosure may satisfy: 0.5<(CT1+CT2+CT3)/T23<1.5, where CT1 is a center thickness of the first lens along the optical axis, CT2 is a center thickness of the second lens along the optical axis, CT3 is a center thickness of the third lens along the optical axis, and T23 is a spaced interval between the second lens and the third lens along the optical axis. As an example, the optical imaging lens assembly of the present disclosure may satisfy the conditional expression 0.6<(CT1+CT2+CT3)/T23<1.5, for example, 0.6<(CT1+CT2+CT3)/T23<1.3. By controlling the ratio of the total center thicknesses of the three lenses along the optical axis to the spaced interval between the second lens and the third lens along the optical axis, the light beams are effectively diverged after passing through the third lens having negative refractive power. At the same time, the third lens shares the third-order distortion aberration of the optical imaging lens assembly, and the optical imaging lens assembly may effectively control the imaging distortion.

In an exemplary embodiment, the above optical imaging lens assembly may further include a stop to improve image quality. The stop may be disposed in front of the first lens, for example.

Optionally, the above optical imaging lens assembly may further include an optical filter for correcting the color deviation and/or a protective glass for protecting the photosensitive element located on an imaging plane.

The optical imaging lens assembly according to the above embodiments of the present disclosure may employ a plurality of lenses, such as three lenses as described above. By properly configuring the refractive power of each lens, the surface shape, the center thickness of each lens, and spaced intervals along the optical axis between the lenses, the size and the sensitivity of the lens assembly may be effectively reduced, and the workability of the lens assembly may be improved, such that the optical imaging lens assembly is more advantageous for production processing and may be applied to portable electronic products.

In the embodiments of the present disclosure, the surfaces of the lenses are mostly aspheric surfaces. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, at least one of the object-side surface and the image-side surface of each of the first lens, the second lens and the third lens may be aspheric. Optionally, the object-side surface and the image-side surface of each of the first lens, the second lens and the third lens may be aspheric.

Some specific examples of the optical imaging lens assembly applicable to the above embodiment will be further described below with reference to the accompanying drawings.

Example 1

Figure 2A:
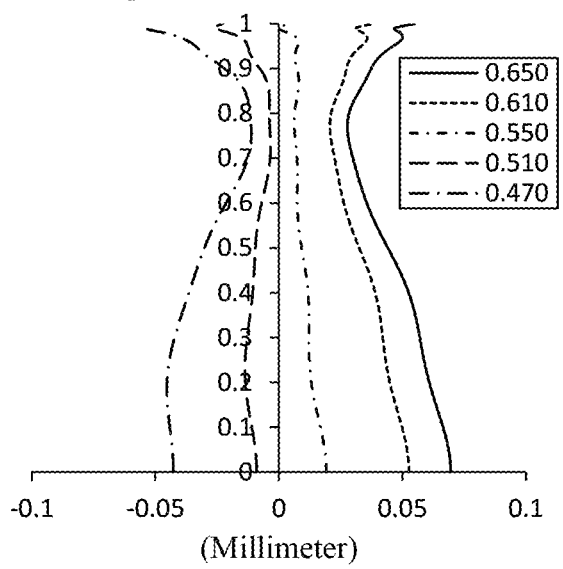
FIGS. 2A to 2D illustrate longitudinal aberration curves, a lateral color curve, astigmatic curves and a distortion curve according to example 1 of the present disclosure, respectively.
Figure 2B:
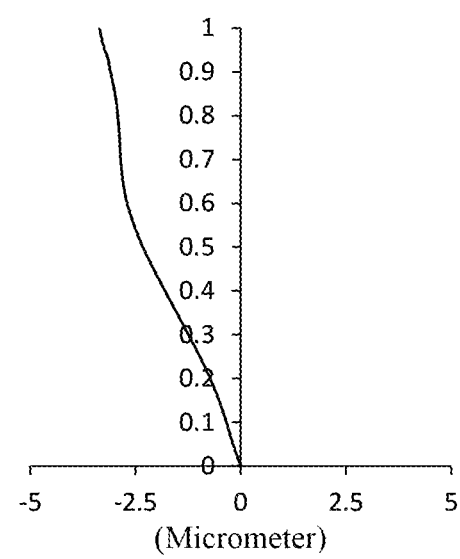
Figures 2C, 2D:
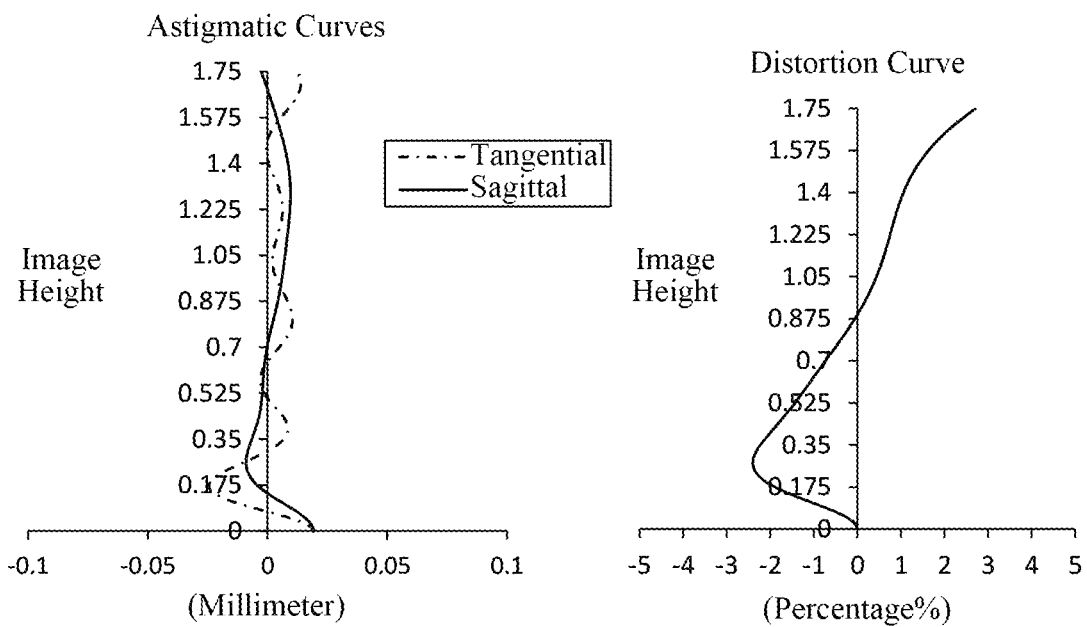

Referring to FIG. 1 to FIG. 2D, an optical imaging lens assembly of this example includes a stop STO, a first lens E1, a second lens E2, a third lens E3 and an optical filter E4, which are sequentially arranged from an object side to an image side along an optical axis. There may be an air interval between each two adjacent lenses.

The first lens E1 has positive refractive power, an object-side surface S1 thereof is convex, and an image-side surface S2 thereof is concave. The second lens E2 has positive refractive power, an object-side surface S3 thereof is convex, and an image-side surface S4 thereof is concave. The third lens E3 has negative refractive power, an object-side surface S5 thereof is convex, and an image-side surface S6 thereof is concave. The optical filter E4 has an object-side surface S7 and an image-side surface S8. The optical imaging lens assembly of this example has an imaging plane S9. Light from an object sequentially passes through the respective surfaces (S1 to S8) and is imaged on the imaging plane S9.

Table 1 is a table illustrating basic parameters of the optical imaging lens assembly of this example, wherein the units for the radius of curvature, the thickness and the focal length are millimeter (mm), and the details are as follows:

TABLE 1

| TTL = 3.91 mm, ImgH = 1.75 mm, Semi-FOV = 21.6°, f = 4.21 mm | | | | | | | |
|---|---|---|---|---|---|---|---|
| Surface number | Surface type | Radius of curvature | Thickness | Refractive index | Abbe number | Focal length | Conic coefficient |
| OBJ | Spherical | Infinite | 300.0000 | | | | |
| STO | Spherical | Infinite | −0.1728 | | | | |
| S1 | Aspheric | 1.4145 | 0.6163 | 1.55 | 56.1 | 3.82 | −1.4670 |
| S2 | Aspheric | 3.7232 | 0.0661 | | | | 16.7807 |
| S3 | Aspheric | 7.4779 | 0.2300 | 1.65 | 23.5 | 24.50 | 72.6815 |
| S4 | Aspheric | 14.0183 | 1.7955 | | | | 27.7518 |
| S5 | Aspheric | 8.1546 | 0.2817 | 1.54 | 55.8 | −3.02 | 52.6033 |
| S6 | Aspheric | 1.3354 | 0.3403 | | | | −91.9520 |
| S7 | Spherical | Infinite | 0.2100 | 1.52 | 64.2 | | |
| S8 | Spherical | Infinite | 0.3651 | | | | |
| S9 | Spherical | Infinite | | | | | |

Here, TTL is a distance along the optical axis from the object-side surface S1 of the first lens E1 to the imaging plane S9 of the optical imaging lens assembly, ImgH is half of a diagonal length of an effective pixel area on the imaging plane S9, Semi-FOV is half of a maximum field-of-view of the optical imaging lens assembly, and f is an effective focal length of the optical imaging lens assembly.

The object-side surface and the image-side surface of any one of the first lens E1 to the third lens E3 of the optical imaging lens assembly are rotationally symmetrical aspheric surfaces. The surface shape x of each aspheric lens may be defined by using, but not limited to, the following aspheric formula:

$$x = \frac{ch^2}{1+\sqrt{1-(k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients A4, A6, A8, A10, A12, A14, A16, A18 and A20 applicable to each aspheric surface S1 to S6 according to example 1.

TABLE 2

| Surface number | A4 | A6 | A8 | A10 | A12 | A14 | A16 | A18 | A20 |
|---|---|---|---|---|---|---|---|---|---|
| S1 | 7.35E−03 | −9.15E−02 | 1.68E−01 | −1.12E+00 | 2.55E+00 | −3.20E+00 | 1.08E+00 | 1.61E+00 | −1.21E+00 |
| S2 | −4.36E−01 | 7.78E−01 | −1.39E+01 | 7.99E+01 | −2.42E+02 | 4.40E+02 | −4.92E+02 | 3.13E+02 | −8.76E+01 |
| S3 | −1.65E−01 | 1.03E+00 | −1.34E+01 | 7.60E+01 | −2.21E+02 | 3.74E+02 | −3.76E+02 | 2.08E+02 | −4.91E+01 |
| S4 | 1.69E−01 | 5.69E−01 | −3.86E+00 | 2.09E+01 | −5.43E+01 | 6.13E+01 | 7.37E+01 | −7.58E+01 | 4.73E+01 |
| S5 | −1.55E+00 | 1.01E+01 | −6.34E+01 | 2.45E+02 | −5.94E+02 | 9.09E+02 | −8.52E+02 | 4.45E+02 | −9.96E+01 |
| S6 | 4.44E−01 | −3.37E+00 | 9.14E+00 | −1.51E+01 | 1.61E+01 | −1.09E+01 | 4.56E+00 | −1.07E+00 | 1.06E−01 |

In this example, the ratio of an effective focal length f of the optical imaging lens assembly to an entrance pupil diameter EPD of the optical imaging lens assembly is 2.57; the ratio of a distance SAG11 along the optical axis from an intersection of the object-side surface of the first lens and the optical axis to a vertex of an effective radius of the object-side surface of the first lens to a distance SAG22 along the optical axis from an intersection of the image-side surface of the second lens and the optical axis to a vertex of an effective radius of the image-side surface of the second lens is 1.56; and the ratio of an edge thickness ET2 of the second lens to a center thickness CT2 of the second lens along the optical axis is 1.23.

FIG. 2A illustrates longitudinal aberration curves of the optical imaging lens assembly according to example 1, representing the deviations of focal points converged by light of different wavelengths after passing through the optical imaging lens assembly. FIG. 2B illustrates a lateral color curve of the optical imaging lens assembly according to example 1, representing the deviations of different image heights on the imaging plane S9 after light passes through the optical imaging lens assembly. FIG. 2C illustrates astigmatic curves of the optical imaging lens assembly according to example 1, representing the curvatures of a tangential plane and the curvatures of a sagittal plane. FIG. 2D illustrates a distortion curve of the optical imaging lens assembly according to example 1, representing the amounts of distortion corresponding to different image heights. It can be seen from FIG. 2A to FIG. 2D that the optical imaging lens assembly provided in example 1 may achieve good image quality.

Example 2

An optical imaging lens assembly according to example 2 of the present disclosure is described below with reference to FIG. 3 to FIG. 4D. In this exemplary example and the following examples, for the purpose of brevity, the description of parts similar to the optical imaging lens assembly in example 1 will be omitted.

Figure 3:
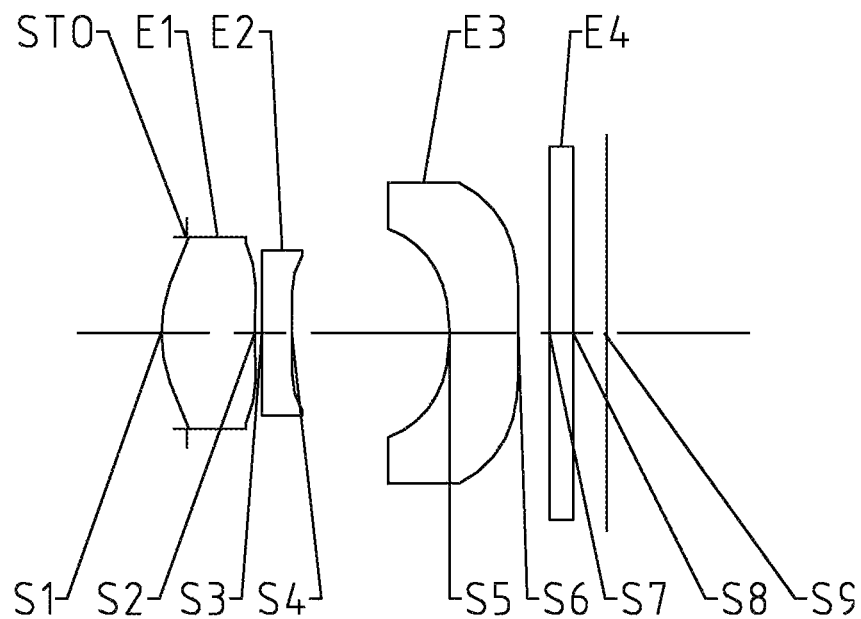
FIG. 3 illustrates a schematic structural view of an optical imaging lens assembly according to example 2 of the present disclosure.

Referring to FIG. 3, an optical imaging lens assembly of this example includes a stop STO, a first lens E1, a second lens E2, a third lens E3 and an optical filter E4, which are sequentially arranged from an object side to an image side along an optical axis. There may be an air interval between each two adjacent lenses.

The first lens E1 has positive refractive power, an object-side surface S1 thereof is convex, and an image-side surface S2 thereof is concave. The second lens E2 has positive refractive power, an object-side surface S3 thereof is convex, and an image-side surface S4 thereof is convex. The third lens E3 has negative refractive power, an object-side surface S5 thereof is concave, and an image-side surface S6 thereof is concave. The optical filter E4 has an object-side surface S7 and an image-side surface S8. The optical imaging lens assembly of this example has an imaging plane S9. Light from an object sequentially passes through the respective surfaces (S1 to S8) and is imaged on the imaging plane S9.

Table 3 is a table illustrating basic parameters of the optical imaging lens assembly of this example, wherein the units for the radius of curvature, the thickness and the focal length are millimeter (mm). Table 4 shows high-order coefficients applicable to each aspheric surface of the optical imaging lens assembly according to this example, wherein the surface shape of each aspheric surface may be defined by the aforementioned formula (1), and the details are as follows:

TABLE 3

TTL = 3.92 mm, ImgH = 1.75 mm, Semi-FOV = 22.8°, f = 4.19 mm

| Surface number | Surface type | Radius of curvature | Thickness | Material Refractive index | Material Abbe number | Focal length | Conic coefficient |
|---|---|---|---|---|---|---|---|
| OBJ | Spherical | Infinite | 300.0000 | | | | |
| STO | Spherical | Infinite | −0.2211 | | | | |
| S1 | Aspheric | 1.3048 | 0.8200 | 1.55 | 56.1 | 3.19 | −1.0104 |
| S2 | Aspheric | 4.0582 | 0.0627 | | | | 18.9704 |
| S3 | Aspheric | 3446.9725 | 0.2635 | 1.65 | 23.5 | 60.66 | −99.0000 |

TABLE 3-continued

TTL = 3.92 mm, ImgH = 1.75 mm, Semi-FOV = 22.8°, f = 4.19 mm

| Surface number | Surface type | Radius of curvature | Thickness | Material Refractive index | Abbe number | Focal length | Conic coefficient |
|---|---|---|---|---|---|---|---|
| S4 | Aspheric | −39.6020 | 1.3902 | | | | 99.0000 |
| S5 | Aspheric | −1.6982 | 0.6049 | 1.54 | 55.8 | −2.78 | −77.7011 |
| S6 | Aspheric | 14.0395 | 0.2720 | | | | −99.0000 |
| S7 | Spherical | Infinite | 0.2100 | 1.52 | 64.2 | | |
| S8 | Spherical | Infinite | 0.2968 | | | | |
| S9 | Spherical | Infinite | | | | | |

Here, TTL is a distance along the optical axis from the object-side surface S1 of the first lens E1 to the imaging plane S9 of the optical imaging lens assembly, ImgH is half of a diagonal length of an effective pixel area on the imaging plane S9, Semi-FOV is half of a maximum field-of-view of the optical imaging lens assembly, and f is an effective focal length of the optical imaging lens assembly.

TABLE 4

| Surface number | A4 | A6 | A8 | A10 | A12 | A14 | A16 | A18 | A20 |
|---|---|---|---|---|---|---|---|---|---|
| S1 | 1.79E−02 | −1.38E−01 | 6.59E−01 | −2.78E+00 | 6.42E+00 | −9.24E+00 | 7.51E+00 | −2.97E+00 | 3.49E−01 |
| S2 | −4.63E−01 | 1.05E+00 | −1.69E+01 | 9.01E+01 | −2.46E+02 | 3.90E+02 | −3.62E+02 | 1.81E+02 | −3.68E+01 |
| S3 | −1.51E−01 | 1.52E+00 | −1.76E+01 | 9.33E+01 | −2.57E+02 | 4.03E+02 | −3.49E+02 | 1.38E+02 | −9.75E+00 |
| S4 | 2.25E−01 | 9.92E−01 | −7.62E+00 | 5.18E+01 | −2.10E+02 | 5.36E+02 | −8.50E+02 | 7.75E+02 | −3.11E+02 |
| S5 | −1.75E+00 | 8.80E+00 | −3.98E+01 | 1.26E+02 | −2.74E+02 | 4.04E+02 | −3.83E+02 | 2.11E+02 | −5.17E+01 |
| S6 | −3.83E−01 | 8.12E−01 | −1.84E+00 | 2.80E+00 | −2.87E+00 | 1.94E+00 | −8.39E−01 | 2.10E−01 | −2.31E−02 |

In this example, the ratio of an effective focal length f of the optical imaging lens assembly to an entrance pupil diameter EPD of the optical imaging lens assembly is 2.54; the ratio of a distance SAG11 along the optical axis from an intersection of the object-side surface of the first lens and the optical axis to a vertex of an effective radius of the object-side surface of the first lens to a distance SAG22 along the optical axis from an intersection of the image-side surface of the second lens and the optical axis to a vertex of an effective radius of the image-side surface of the second lens is 2.61; and the ratio of an edge thickness ET2 of the second lens to a center thickness CT2 of the second lens along the optical axis is 1.34.

Figures 4A, 4B:
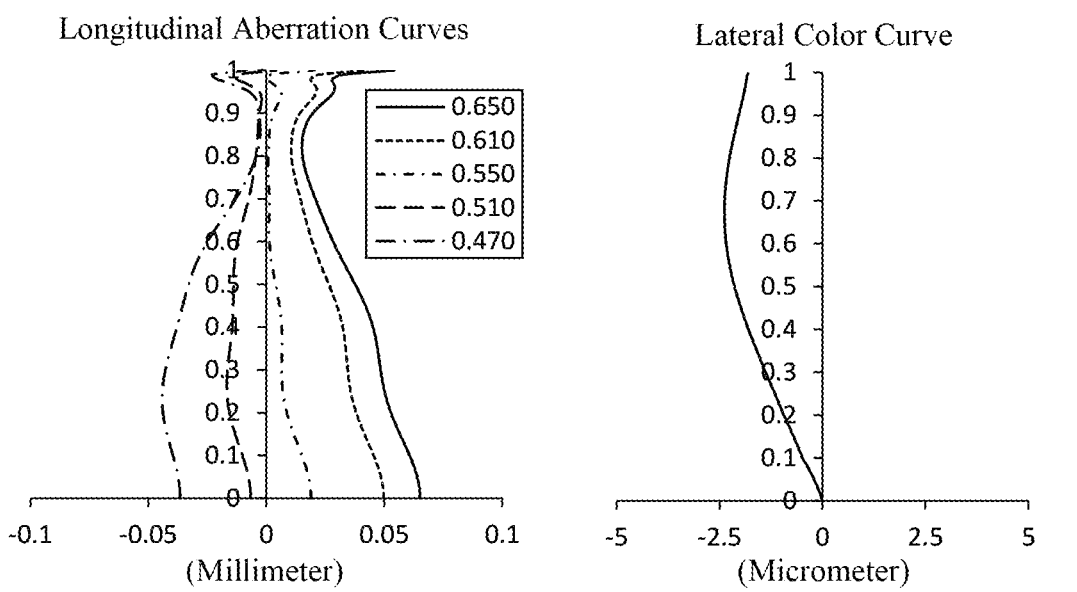
FIGS. 4A to 4D illustrate longitudinal aberration curves, a lateral color curve, astigmatic curves and a distortion curve according to example 2 of the present disclosure, respectively.
Figures 4C, 4D:
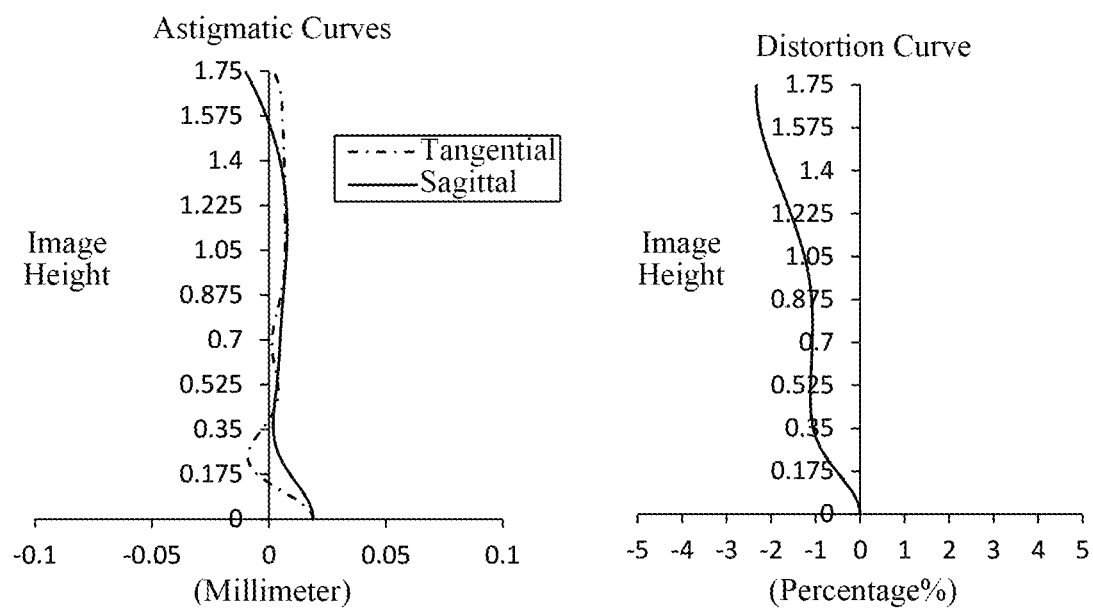

FIG. 4A illustrates longitudinal aberration curves of the optical imaging lens assembly according to this example, representing the deviations of focal points converged by light of different wavelengths after passing through the optical imaging lens assembly. FIG. 4B illustrates a lateral color curve of the optical imaging lens assembly according to this example, representing the deviations of different image heights on the imaging plane S9 after light passes through the optical imaging lens assembly. FIG. 4C illustrates astigmatic curves of the optical imaging lens assembly according to this example, representing the curvatures of a tangential plane and the curvatures of a sagittal plane. FIG. 4D illustrates a distortion curve of the optical imaging lens assembly according to this example, representing the amounts of distortion corresponding to different image heights. It can be seen from FIG. 4A to FIG. 4D that the optical imaging lens assembly provided in this example may achieve good image quality.

Example 3

Figure 5:
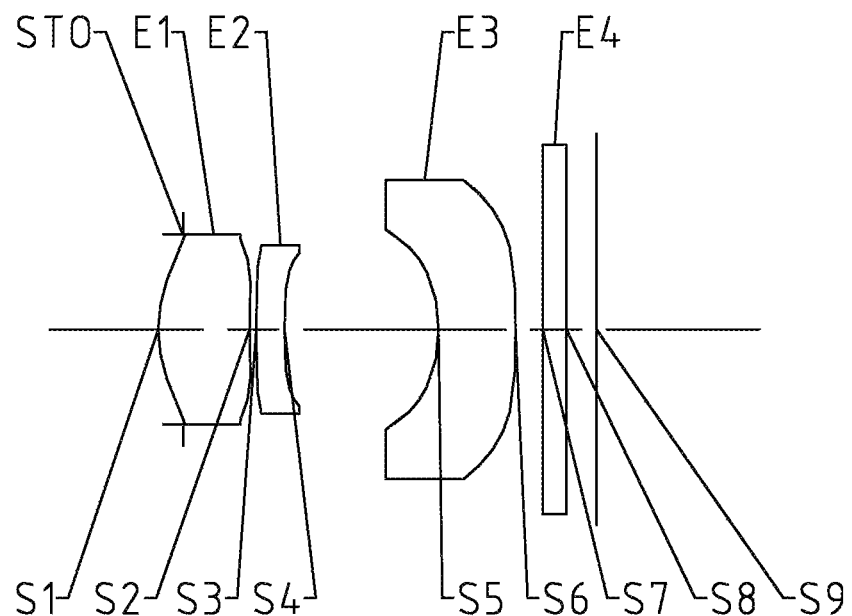
FIG. 5 illustrates a schematic structural view of an optical imaging lens assembly according to example 3 of the present disclosure.

Referring to FIG. 5 to FIG. 6D, an optical imaging lens assembly of this example includes a stop STO, a first lens E1, a second lens E2, a third lens E3 and an optical filter E4, which are sequentially arranged from an object side to an image side along an optical axis. There may be an air interval between each two adjacent lenses.

The first lens E1 has positive refractive power, an object-side surface S1 thereof is convex, and an image-side surface S2 thereof is concave. The second lens E2 has positive refractive power, an object-side surface S3 thereof is convex, and an image-side surface S4 thereof is concave. The third lens E3 has negative refractive power, an object-side surface S5 thereof is concave, and an image-side surface S6 thereof is convex. The optical filter E4 has an object-side surface S7 and an image-side surface S8. The optical imaging lens assembly of this example has an imaging plane S9. Light from an object sequentially passes through the respective surfaces (S1 to S8) and is imaged on the imaging plane S9.

Table 5 is a table illustrating basic parameters of the optical imaging lens assembly of this example, wherein the units for the radius of curvature, the thickness and the focal length are millimeter (mm). Table 6 shows high-order coefficients applicable to each aspheric surface of the optical imaging lens assembly according to this example, wherein the surface shape of each aspheric surface may be defined by the aforementioned formula (1), and the details are as follows:

TABLE 5

TTL = 3.91 mm, ImgH = 1.75 mm, Semi-FOV = 22.3°, f = 4.22 mm

| Surface number | Surface type | Radius of curvature | Thickness | Material Refractive index | Abbe number | Focal length | Conic coefficient |
|---|---|---|---|---|---|---|---|
| OBJ | Spherical | Infinite | 300.0000 | | | | |
| STO | Spherical | Infinite | −0.2206 | | | | |
| S1 | Aspheric | 1.2988 | 0.8132 | 1.55 | 56.1 | 3.17 | −1.0649 |
| S2 | Aspheric | 4.0298 | 0.0607 | | | | 18.8187 |
| S3 | Aspheric | 8.7303 | 0.2513 | 1.65 | 23.5 | 65.72 | 74.7630 |
| S4 | Aspheric | 10.8686 | 1.3741 | | | | −47.7342 |
| S5 | Aspheric | −1.4503 | 0.6864 | 1.54 | 55.8 | −2.70 | −96.6460 |
| S6 | Aspheric | −4543.3929 | 0.2447 | | | | 99.0000 |
| S7 | Spherical | Infinite | 0.2100 | 1.52 | 64.2 | | |
| S8 | Spherical | Infinite | 0.2673 | | | | |
| S9 | Spherical | Infinite | | | | | |

Here, TTL is a distance along the optical axis from the object-side surface S1 of the first lens E1 to the imaging plane S9 of the optical imaging lens assembly, ImgH is half of a diagonal length of an effective pixel area on the imaging plane S9, Semi-FOV is half of a maximum field-of-view of the optical imaging lens assembly, and f is an effective focal length of the optical imaging lens assembly.

TABLE 6

| Surface number | A4 | A6 | A8 | A10 | A12 | A14 | A16 | A18 | A20 |
|---|---|---|---|---|---|---|---|---|---|
| S1 | 6.96E−03 | 3.25E−02 | −7.79E−01 | 4.19E+00 | −1.47E+01 | 3.07E+01 | −3.86E+01 | 2.67E+01 | −7.82E+00 |
| S2 | −4.24E−01 | 6.39E−01 | −1.38E+01 | 7.99E+01 | −2.35E+02 | 4.07E+02 | −4.25E+02 | 2.48E+02 | −6.27E+01 |
| S3 | −9.77E−02 | 1.30E+00 | −1.71E+01 | 9.59E+01 | −2.84E+02 | 4.95E+02 | −5.12E+02 | 2.86E+02 | −6.51E+01 |
| S4 | 2.97E−01 | 7.85E−01 | −6.52E+00 | 4.58E+01 | −1.93E+02 | 5.23E+02 | −8.90E+02 | 8.71E+02 | −3.71E+02 |
| S5 | −2.48E+00 | 1.65E+01 | −8.75E+01 | 3.09E+02 | −7.26E+02 | 1.11E+03 | −1.07E+03 | 5.82E+02 | −1.38E+02 |
| S6 | −2.91E−01 | 5.96E−01 | −1.47E+00 | 2.34E+00 | −2.41E+00 | 1.59E+00 | −6.54E−01 | 1.52E−01 | −1.54E−02 |

In this example, the ratio of an effective focal length f of the optical imaging lens assembly to an entrance pupil diameter EPD of the optical imaging lens assembly is 2.54; the ratio of a distance SAG11 along the optical axis from an intersection of the object-side surface of the first lens and the optical axis to a vertex of an effective radius of the object-side surface of the first lens to a distance SAG22 along the optical axis from an intersection of the image-side surface of the second lens and the optical axis to a vertex of an effective radius of the image-side surface of the second lens is 1.81; and the ratio of an edge thickness ET2 of the second lens to a center thickness CT2 of the second lens along the optical axis is 1.35.

Figure 6A:
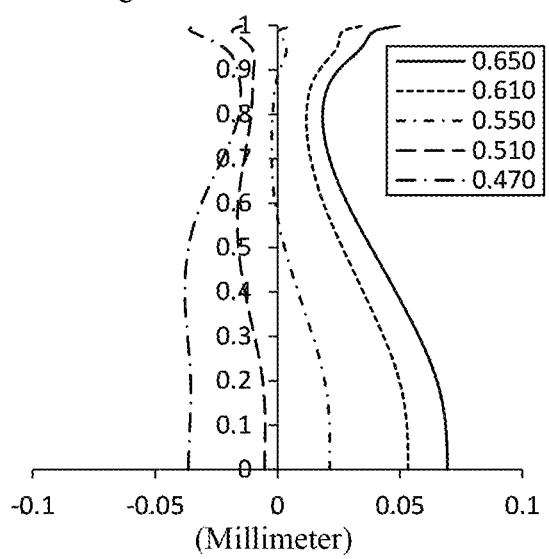
Figure 6B:
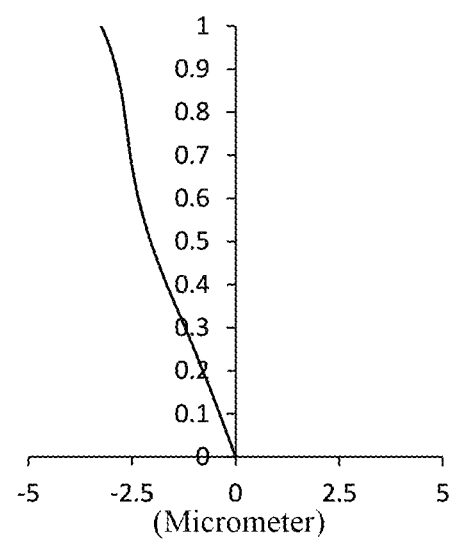

FIG. 6A illustrates longitudinal aberration curves of the optical imaging lens assembly according to this example, representing the deviations of focal points converged by light of different wavelengths after passing through the optical imaging lens assembly. FIG. 6B illustrates a lateral color curve of the optical imaging lens assembly according to this example, representing the deviations of different image heights on the imaging plane S9 after light passes through the optical imaging lens assembly. FIG. 6C illustrates astigmatic curves of the optical imaging lens assembly according to this example, representing the curvatures of a tangential plane and the curvatures of a sagittal plane. FIG. 6D illustrates a distortion curve of the optical imaging lens assembly according to this example, representing the amounts of distortion corresponding to different image heights. It can be seen from FIG. 6A to FIG. 6D that the optical imaging lens assembly provided in this example may achieve good image quality.

Example 4

Referring to FIG. 7 to FIG. 8D, an optical imaging lens assembly of this example includes a stop STO, a first lens E1, a second lens E2, a third lens E3 and an optical filter E4, which are sequentially arranged from an object side to an image side along an optical axis. There may be an air interval between each two adjacent lenses.

The first lens E1 has positive refractive power, an object-side surface S1 thereof is convex, and an image-side surface S2 thereof is concave. The second lens E2 has positive refractive power, an object-side surface S3 thereof is convex, and an image-side surface S4 thereof is concave. The third lens E3 has negative refractive power, an object-side surface S5 thereof is concave, and an image-side surface S6 thereof is concave. The optical filter E4 has an object-side surface S7 and an image-side surface S8. The optical imaging lens assembly of this example has an imaging plane S9. Light from an object sequentially passes through the respective surfaces (S1 to S8) and is imaged on the imaging plane S9.

Table 7 is a table illustrating basic parameters of the optical imaging lens assembly of this example, wherein the units for the radius of curvature, the thickness and the focal length are millimeter (mm). Table 8 shows high-order coefficients applicable to each aspheric surface of the optical imaging lens assembly according to this example, wherein the surface shape of each aspheric surface may be defined by the aforementioned formula (1), and the details are as follows:

TABLE 7

TTL = 3.90 mm, ImgH = 1.75 mm, Semi-FOV = 22.5°, f = 4.22 mm

| Surface number | Surface type | Radius of curvature | Thickness | Material Refractive index | Abbe number | Focal length | Conic coefficient |
|---|---|---|---|---|---|---|---|
| OBJ | Spherical | Infinite | 300.0000 | | | | |
| STO | Spherical | Infinite | −0.2231 | | | | |
| S1 | Aspheric | 1.2983 | 0.8149 | 1.55 | 56.1 | 3.17 | −1.0421 |
| S2 | Aspheric | 4.0272 | 0.0608 | | | | 18.8821 |
| S3 | Aspheric | 9.0244 | 0.2532 | 1.65 | 23.5 | 239.66 | 72.6258 |
| S4 | Aspheric | 9.4780 | 1.3960 | | | | −56.4106 |
| S5 | Aspheric | −1.7714 | 0.5902 | 1.54 | 55.8 | −2.79 | −99.0000 |
| S6 | Aspheric | 10.8914 | 0.2750 | | | | 53.6574 |
| S7 | Spherical | Infinite | 0.2100 | 1.52 | 64.2 | | |
| S8 | Spherical | Infinite | 0.2998 | | | | |
| S9 | Spherical | Infinite | | | | | |

Here, TTL is a distance along the optical axis from the object-side surface S1 of the first lens E1 to the imaging plane S9 of the optical imaging lens assembly, ImgH is half of a diagonal length of an effective pixel area on the imaging plane S9, Semi-FOV is half of a maximum field-of-view of the optical imaging lens assembly, and f is an effective focal length of the optical imaging lens assembly.

TABLE 8

| Surface number | A4 | A6 | A8 | A10 | A12 | A14 | A16 | A18 | A20 |
|---|---|---|---|---|---|---|---|---|---|
| S1 | 1.10E−02 | −2.90E−02 | −2.41E−01 | 1.46E+00 | −6.07E+00 | 1.39E+01 | −1.87E+01 | 1.37E+01 | −4.16E+00 |
| S2 | −4.14E−01 | 4.90E−01 | −1.32E+01 | 7.97E+01 | −2.39E+02 | 4.19E+02 | −4.40E+02 | 2.59E+02 | −6.57E+01 |
| S3 | −8.33E−02 | 1.07E+00 | −1.61E+01 | 9.36E+01 | −2.81E+02 | 4.95E+02 | −5.11E+02 | 2.83E+02 | −6.26E+01 |
| S4 | 2.68E−01 | 1.52E+00 | −1.56E+01 | 1.11E+02 | −4.78E+02 | 1.31E+03 | −2.20E+03 | 2.09E+03 | −8.56E+02 |
| S5 | −1.82E+00 | 9.66E+00 | −4.48E+01 | 1.43E+02 | −3.07E+02 | 4.39E+02 | −3.98E+02 | 2.08E+02 | −4.73E+01 |
| S6 | −4.18E−01 | 8.97E−01 | −2.13E+00 | 3.40E+00 | −3.60E+00 | 2.50E+00 | −1.09E+00 | 2.72E−01 | −2.95E−02 |

In this example, the ratio of an effective focal length f of the optical imaging lens assembly to an entrance pupil diameter EPD of the optical imaging lens assembly is 2.54; the ratio of a distance SAG11 along the optical axis from an intersection of the object-side surface of the first lens and the optical axis to a vertex of an effective radius of the object-side surface of the first lens to a distance SAG22 along the optical axis from an intersection of the image-side surface of the second lens and the optical axis to a vertex of an effective radius of the image-side surface of the second lens is 1.80; and the ratio of an edge thickness ET2 of the second lens to a center thickness CT2 of the second lens along the optical axis is 1.37.

FIG. 8A illustrates longitudinal aberration curves of the optical imaging lens assembly according to this example, representing the deviations of focal points converged by light of different wavelengths after passing through the optical imaging lens assembly. FIG. 8B illustrates a lateral color curve of the optical imaging lens assembly according to this example, representing the deviations of different image heights on the imaging plane S9 after light passes through the optical imaging lens assembly. FIG. 8C illustrates astigmatic curves of the optical imaging lens assembly according to this example, representing the curvatures of a tangential plane and the curvatures of a sagittal plane. FIG. 8D illustrates a distortion curve of the optical imaging lens assembly according to this example, representing the amounts of distortion corresponding to different image heights. It can be seen from FIG. 8A to FIG. 8D that the optical imaging lens assembly provided in this example may achieve good image quality.

Example 5

Figure 9:
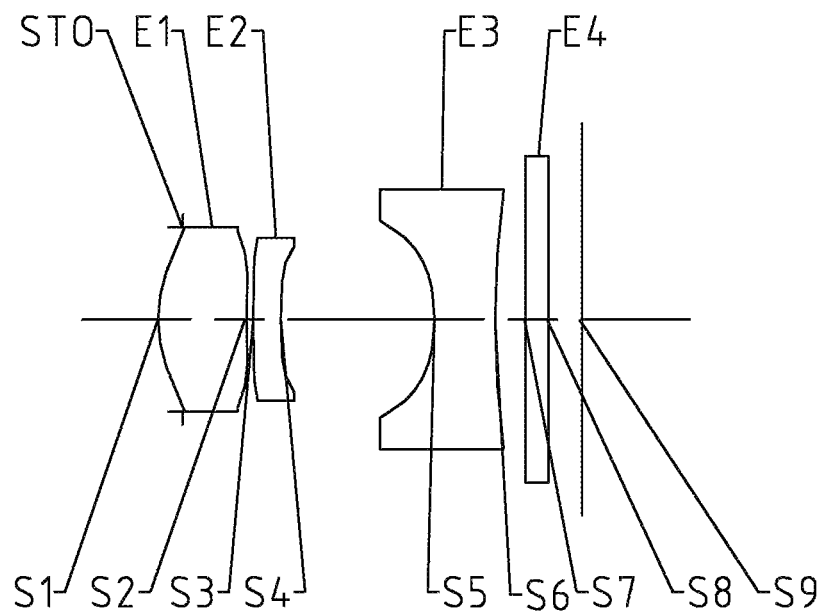
FIG. 9 illustrates a schematic structural view of an optical imaging lens assembly according to example 5 of the present disclosure.
Figure 10A:
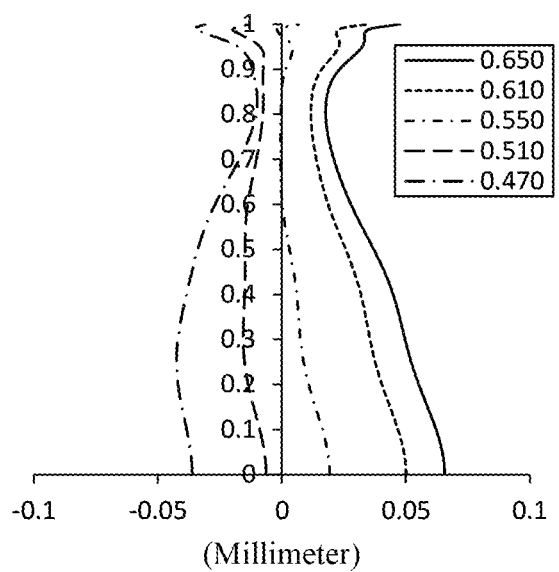
FIGS. 10A to 10D illustrate longitudinal aberration curves, a lateral color curve, astigmatic curves and a distortion curve according to example 5 of the present disclosure, respectively.
Figure 10B:
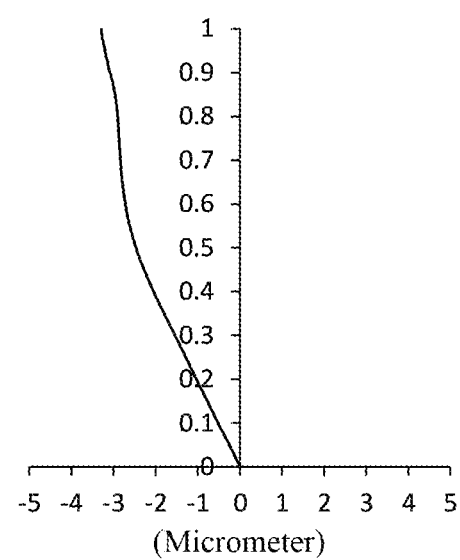
Figures 10C, 10D:
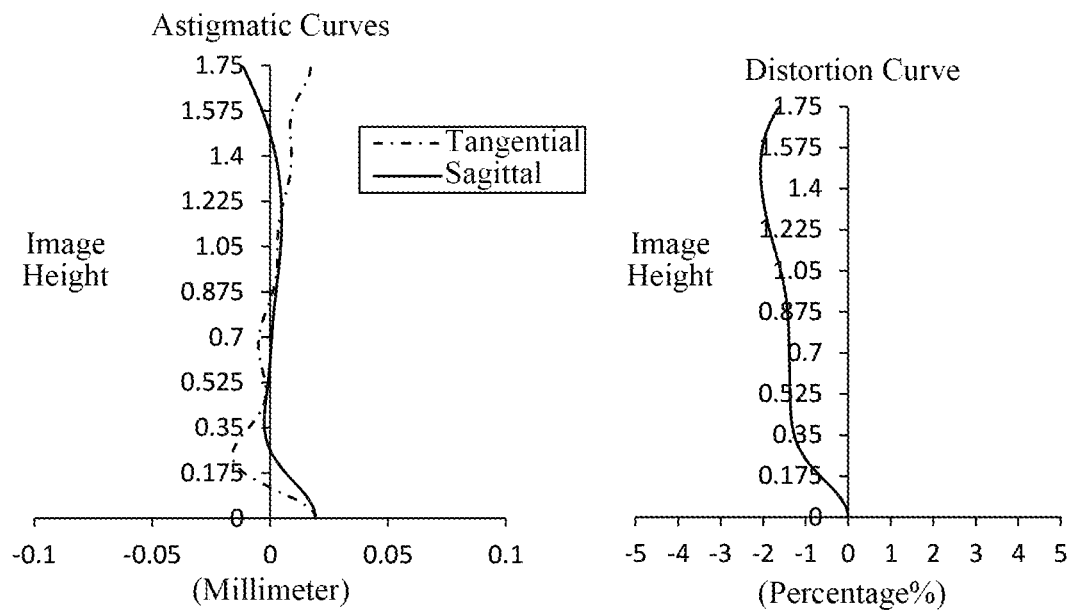

Referring to FIG. 9 to FIG. 10D, an optical imaging lens assembly of this example includes a stop STO, a first lens E1, a second lens E2, a third lens E3 and an optical filter E4, which are sequentially arranged from an object side to an image side along an optical axis. There may be an air interval between each two adjacent lenses.

The first lens E1 has positive refractive power, an object-side surface S1 thereof is convex, and an image-side surface S2 thereof is concave. The second lens E2 has positive refractive power, an object-side surface S3 thereof is convex, and an image-side surface S4 thereof is concave. The third lens E3 has negative refractive power, an object-side surface S5 thereof is concave, and an image-side surface S6 thereof is concave. The optical filter E4 has an object-side surface S7 and an image-side surface S8. The optical imaging lens assembly of this example has an imaging plane S9. Light from an object sequentially passes through the respective surfaces (S1 to S8) and is imaged on the imaging plane S9.

Table 9 is a table illustrating basic parameters of the optical imaging lens assembly of this example, wherein the units for the radius of curvature, the thickness and the focal length are millimeter (mm). Table 10 shows high-order coefficients applicable to each aspheric surface of the optical imaging lens assembly according to this example, wherein the surface shape of each aspheric surface may be defined by the aforementioned formula (1), and the details are as follows:

TABLE 9

TTL = 3.89 mm, ImgH = 1.75 mm, Semi-FOV = 22.4°, f = 4.23 mm

| Surface number | Surface type | Radius of curvature | Thickness | Material Refractive index | Abbe number | Focal length | Conic coefficient |
|---|---|---|---|---|---|---|---|
| OBJ | Spherical | Infinite | 300.0000 | | | | |
| STO | Spherical | Infinite | −0.2249 | | | | |
| S1 | Aspheric | 1.2981 | 0.8140 | 1.55 | 56.1 | 3.17 | −1.0304 |
| S2 | Aspheric | 4.0219 | 0.0609 | | | | 18.9117 |
| S3 | Aspheric | 9.4141 | 0.2541 | 1.65 | 23.5 | 400.55 | 70.2309 |
| S4 | Aspheric | 9.6664 | 1.4136 | | | | −84.9187 |
| S5 | Aspheric | −1.7973 | 0.5591 | 1.54 | 55.8 | −2.76 | −99.0000 |
| S6 | Aspheric | 9.4038 | 0.2792 | | | | 47.4079 |
| S7 | Spherical | Infinite | 0.2100 | 1.52 | 64.2 | | |
| S8 | Spherical | Infinite | 0.3040 | | | | |
| S9 | Spherical | Infinite | | | | | |

Here, TTL is a distance along the optical axis from the object-side surface S1 of the first lens E1 to the imaging plane S9 of the optical imaging lens assembly, ImgH is half of a diagonal length of an effective pixel area on the imaging plane S9, Semi-FOV is half of a maximum field-of-view of the optical imaging lens assembly, and f is an effective focal length of the optical imaging lens assembly.

TABLE 10

| Surface number | A4 | A6 | A8 | A10 | A12 | A14 | A16 | A18 | A20 |
|---|---|---|---|---|---|---|---|---|---|
| S1 | 1.15E−02 | −3.62E−02 | −1.70E−01 | 1.09E+00 | −4.90E+00 | 1.17E+01 | −1.61E+01 | 1.20E+01 | −3.70E+00 |
| S2 | −4.14E−01 | 3.82E−01 | −1.22E+01 | 7.51E+01 | −2.26E+02 | 3.97E+02 | −4.17E+02 | 2.43E+02 | −6.15E+01 |
| S3 | −8.48E−02 | 8.83E−01 | −1.42E+01 | 8.42E+01 | −2.50E+02 | 4.26E+02 | −4.13E+02 | 2.03E+02 | −3.53E+01 |
| S4 | 2.74E−01 | 1.27E+00 | −1.26E+01 | 8.85E+01 | −3.72E+02 | 9.78E+02 | −1.58E+03 | 1.43E+03 | −5.63E+02 |
| S5 | −1.76E+00 | 8.56E+00 | −3.72E+01 | 1.12E+02 | −2.28E+02 | 3.12E+02 | −2.71E+02 | 1.36E+02 | −2.99E+01 |
| S6 | −4.43E−01 | 8.13E−01 | −1.66E+00 | 2.33E+00 | −2.24E+00 | 1.47E+00 | −6.36E−01 | 1.65E−01 | −1.96E−02 |

In this example, the ratio of an effective focal length f of the optical imaging lens assembly to an entrance pupil diameter EPD of the optical imaging lens assembly is 2.54; the ratio of a distance SAG11 along the optical axis from an intersection of the object-side surface of the first lens and the optical axis to a vertex of an effective radius of the object-side surface of the first lens to a distance SAG22 along the optical axis from an intersection of the image-side surface of the second lens and the optical axis to a vertex of an effective radius of the image-side surface of the second lens is 1.99; and the ratio of an edge thickness ET2 of the second lens to a center thickness CT2 of the second lens along the optical axis is 1.33.

FIG. 10A illustrates longitudinal aberration curves of the optical imaging lens assembly according to this example, representing the deviations of focal points converged by light of different wavelengths after passing through the optical imaging lens assembly. FIG. 10B illustrates a lateral color curve of the optical imaging lens assembly according to this example, representing the deviations of different image heights on the imaging plane S9 after light passes through the optical imaging lens assembly. FIG. 10C illustrates astigmatic curves of the optical imaging lens assembly according to this example, representing the curvatures of a tangential plane and the curvatures of a sagittal plane. FIG. 10D illustrates a distortion curve of the optical imaging lens assembly according to this example, representing the amounts of distortion corresponding to different image heights. It can be seen from FIG. 10A to FIG. 10D that the optical imaging lens assembly provided in this example may achieve good image quality.

Example 6

Figure 11:
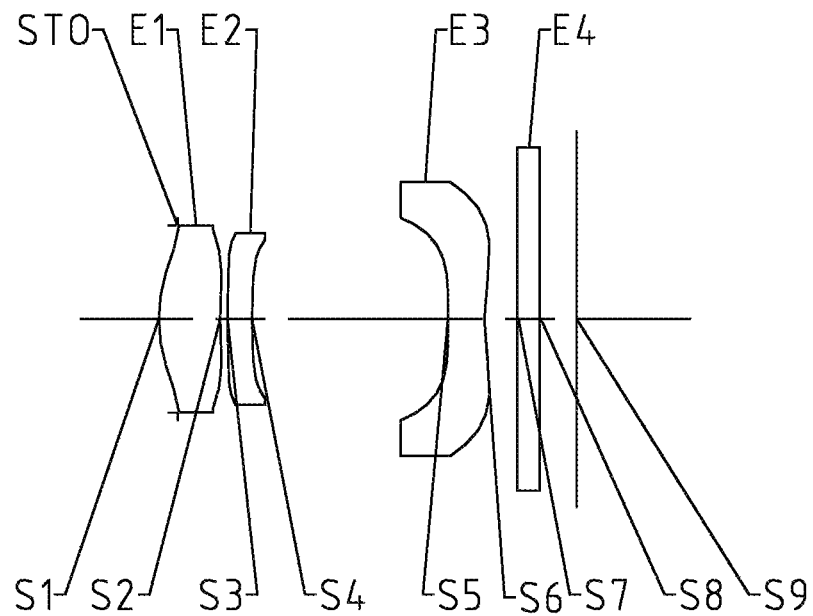
FIG. 11 illustrates a schematic structural view of an optical imaging lens assembly according to example 6 of the present disclosure.
Figure 12A:
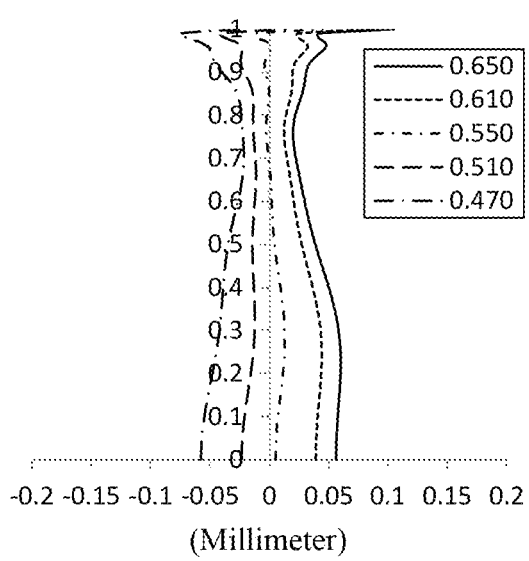
FIGS. 12A to 12D illustrate longitudinal aberration curves, a lateral color curve, astigmatic curves and a distortion curve according to example 6 of the present disclosure, respectively.
Figure 12B:
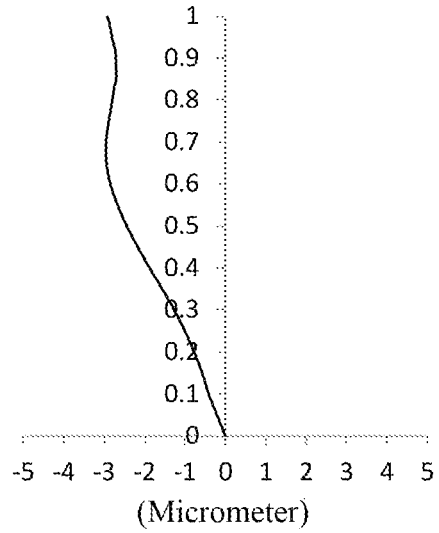
Figure 12C:
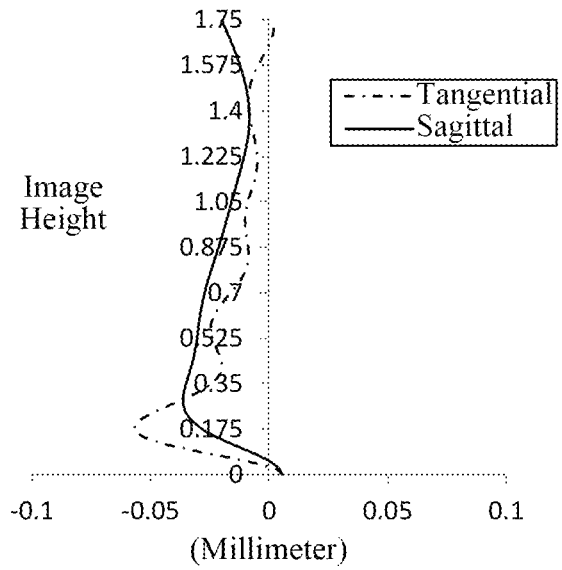
Figure 12D:
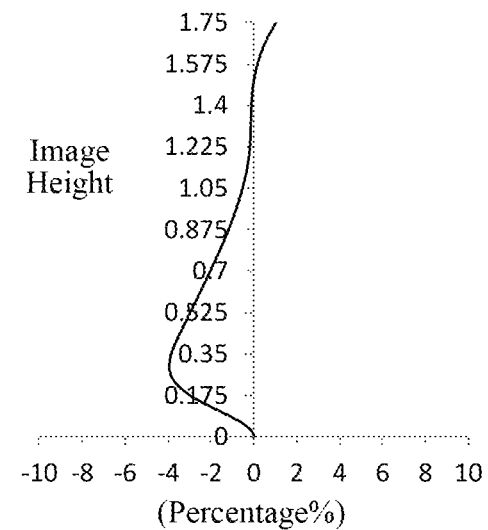

Referring to FIG. 11 to FIG. 12D, an optical imaging lens assembly of this example includes a stop STO, a first lens E1, a second lens E2, a third lens E3 and an optical filter E4, which are sequentially arranged from an object side to an image side along an optical axis. There may be an air interval between each two adjacent lenses.

The first lens E1 has positive refractive power, an object-side surface S1 thereof is convex, and an image-side surface S2 thereof is concave. The second lens E2 has positive refractive power, an object-side surface S3 thereof is convex, and an image-side surface S4 thereof is concave. The third lens E3 has negative refractive power, an object-side surface S5 thereof is convex, and an image-side surface S6 thereof is concave. The optical filter E4 has an object-side surface S7 and an image-side surface S8. The optical imaging lens assembly of this example has an imaging plane S9. Light from an object sequentially passes through the respective surfaces (S1 to S8) and is imaged on the imaging plane S9.

Table 11 is a table illustrating basic parameters of the optical imaging lens assembly of this example, wherein the units for the radius of curvature, the thickness and the focal length are millimeter (mm). Table 12 shows high-order coefficients applicable to each aspheric surface of the optical imaging lens assembly according to this example, wherein the surface shape of each aspheric surface may be defined by the aforementioned formula (1), and the details are as follows:

TABLE 11

TTL = 3.88 mm, ImgH = 1.75 mm, Semi-FOV = 22.0°, f = 4.19 mm

| Surface number | Surface type | Radius of curvature | Thickness | Material Refractive index | Abbe number | Focal length | Conic coefficient |
|---|---|---|---|---|---|---|---|
| OBJ | Spherical | Infinite | 300.0000 | | | | |
| STO | Spherical | Infinite | −0.1772 | | | | |
| S1 | Aspheric | 1.4148 | 0.5736 | 1.55 | 56.1 | 3.85 | −1.5642 |
| S2 | Aspheric | 3.7127 | 0.0671 | | | | 16.8810 |
| S3 | Aspheric | 7.4779 | 0.2300 | 1.65 | 23.5 | 21.86 | 74.5134 |
| S4 | Aspheric | 15.7206 | 1.8270 | | | | −91.7235 |
| S5 | Aspheric | 9.2538 | 0.3397 | 1.54 | 55.8 | −2.73 | 68.6809 |
| S6 | Aspheric | 1.2502 | 0.3063 | | | | −98.8112 |
| S7 | Spherical | Infinite | 0.2100 | 1.52 | 64.2 | | |
| S8 | Spherical | Infinite | 0.3451 | | | | |
| S9 | Spherical | Infinite | | | | | |

Here, TTL is a distance along the optical axis from the object-side surface S1 of the first lens E1 to the imaging plane S9 of the optical imaging lens assembly, ImgH is half of a diagonal length of an effective pixel area on the imaging plane S9, Semi-FOV is half of a maximum field-of-view of the optical imaging lens assembly, and f is an effective focal length of the optical imaging lens assembly.

TABLE 12

| Surface number | A4 | A6 | A8 | A10 | A12 | A14 | A16 | A18 | A20 |
|---|---|---|---|---|---|---|---|---|---|
| S1 | 1.05E−02 | −1.04E−01 | 1.66E−01 | −1.21E+00 | 3.27E+00 | −5.78E+00 | 5.56E+00 | −2.11E+00 | −6.30E−03 |
| S2 | −4.11E−01 | 6.23E−01 | −1.39E+01 | 8.67E+01 | −2.80E+02 | 5.41E+02 | −6.39E+02 | 4.26E+02 | −1.24E+02 |
| S3 | −1.66E−01 | 1.09E+00 | −1.56E+01 | 9.61E+01 | −3.09E+02 | 5.92E+02 | −6.86E+02 | 4.46E+02 | −1.26E+02 |
| S4 | 1.84E−01 | 1.58E−01 | −9.23E−01 | 9.66E+00 | −3.14E+01 | 4.55E+01 | −2.07E+01 | −1.35E+01 | 1.22E+01 |
| S5 | −1.31E+00 | 8.46E+00 | −5.06E+01 | 1.84E+02 | −4.21E+02 | 6.05E+02 | −5.32E+02 | 2.61E+02 | −5.46E+01 |
| S6 | 5.09E−01 | −2.85E+00 | 6.53E+00 | −9.22E+00 | 8.30E+00 | −4.74E+00 | 1.65E+00 | −3.17E−01 | 2.54E−02 |

In this example, the ratio of an effective focal length f of the optical imaging lens assembly to an entrance pupil diameter EPD of the optical imaging lens assembly is 2.54; the ratio of a distance SAG11 along the optical axis from an intersection of the object-side surface of the first lens and the optical axis to a vertex of an effective radius of the object-side surface of the first lens to a distance SAG22 along the optical axis from an intersection of the image-side surface of the second lens and the optical axis to a vertex of an effective radius of the image-side surface of the second lens is 1.57; and the ratio of an edge thickness ET2 of the second lens to a center thickness CT2 of the second lens along the optical axis is 1.19.

FIG. 12A illustrates longitudinal aberration curves of the optical imaging lens assembly according to this example, representing the deviations of focal points converged by light of different wavelengths after passing through the optical imaging lens assembly. FIG. 12B illustrates a lateral color curve of the optical imaging lens assembly according to this example, representing the deviations of different image heights on the imaging plane S9 after light passes through the optical imaging lens assembly. FIG. 12C illustrates astigmatic curves of the optical imaging lens assembly according to this example, representing the curvatures of a tangential plane and the curvatures of a sagittal plane. FIG. 12D illustrates a distortion curve of the optical imaging lens assembly according to this example, representing the amounts of distortion corresponding to different image heights. It can be seen from FIG. 12A to FIG. 12D that the optical imaging lens assembly provided in this example may achieve good image quality.

In view of the above, examples 1 to 6 respectively satisfy the relationship shown in Table 13 below.

TABLE 13

| Conditional/Example | 1 | 2 | 3 | 4 | 5 | 6 |
|---|---|---|---|---|---|---|
| TTL/f | 0.93 | 0.94 | 0.93 | 0.92 | 0.92 | 0.93 |
| TTL/ImgH | 2.23 | 2.24 | 2.23 | 2.23 | 2.23 | 2.22 |
| f1/|f3| | 1.27 | 1.14 | 1.18 | 1.14 | 1.15 | 1.41 |
| R2/R1 | 2.63 | 3.11 | 3.10 | 3.10 | 3.10 | 2.62 |
| CT1/CT2 | 2.68 | 3.11 | 3.24 | 3.22 | 3.20 | 2.49 |
| (CT1 + CT2 + CT3)/T23 | 0.63 | 1.21 | 1.27 | 1.19 | 1.15 | 0.63 |
| SAG11/SAG22 | 1.56 | 2.61 | 1.81 | 1.80 | 1.99 | 1.57 |
| ET2/CT2 | 1.23 | 1.34 | 1.35 | 1.37 | 1.33 | 1.19 |
| f/EPD | 2.57 | 2.54 | 2.54 | 2.54 | 2.54 | 2.54 |

However, it will be understood by those skilled in the art that the number of lenses constituting the optical imaging lens assembly may be varied to achieve various results and advantages described in this specification without departing from the technical solution claimed by the present disclosure. For example, although the embodiment is described by taking three lenses as an example, the optical imaging lens assembly is not limited to include three lenses. The optical imaging lens assembly may also include other numbers of lenses if desired.

In an exemplary embodiment, the present disclosure further provides a camera apparatus which is provided with an electronic photosensitive element for imaging. The electronic photosensitive element may be a photosensitive Charge-Coupled Device (CCD) or a Complementary Metal-Oxide Semiconductor (CMOS). The camera apparatus may be an independent imaging device such as a digital camera, or may be an imaging module integrated in a mobile electronic device such as a mobile phone. The camera apparatus is equipped with the optical imaging lens assembly described above.

The exemplary examples of the present disclosure have been described above with reference to the accompanying drawings. It should be appreciated by those skilled in the art that the above-mentioned examples are only examples for illustrative purposes, and are not used to limit the scope of the present disclosure. Any modification, equivalent replacement, etc. made under the teaching of the present disclosure or the protection scope of the claims shall be included in the protection scope of the present disclosure.

What is claimed is:

1. An optical imaging lens assembly, sequentially from an object side to an image side of the optical imaging lens assembly along an optical axis, comprising:
    a first lens having positive refractive power;
    a second lens having positive refractive power and a convex object-side surface; and
    a third lens having negative refractive power,
    wherein $2.0<TTL/ImgH<2.5$,
    where TTL is a distance along the optical axis from an object-side surface of the first lens to an imaging plane of the optical imaging lens assembly, and ImgH is half of a diagonal length of an effective pixel area on the imaging plane, and
    wherein $0.5<(CT1+CT2+CT3)/T23<1.5$,
    where CT1 is a center thickness of the first lens along the optical axis, CT2 is a center thickness of the second lens along the optical axis, CT3 is a center thickness of the third lens along the optical axis, and T23 is a spaced interval between the second lens and the third lens along the optical axis.

2. The optical imaging lens assembly according to claim 1, wherein the object-side surface of the first lens is convex, and an image-side surface thereof is concave.

3. The optical imaging lens assembly according to claim 1, wherein $TTL/f<1.0$,
    where TTL is the distance along the optical axis from the object-side surface of the first lens to the imaging plane of the optical imaging lens assembly, and f is an effective focal length of the optical imaging lens assembly.

4. The optical imaging lens assembly according to claim 1, wherein Semi-FOV>20°,
    where Semi-FOV is half of a maximum field-of-view of the optical imaging lens assembly.

5. The optical imaging lens assembly according to claim 1, wherein $f/EPD<2.6$,
    where f is an effective focal length of the optical imaging lens assembly, and EPD is an entrance pupil diameter of the optical imaging lens assembly.

6. The optical imaging lens assembly according to claim 1, wherein $1.0<f1/|f3|<1.5$,
    where f1 is an effective focal length of the first lens, and |f3| an absolute value of an effective focal length of the third lens.

7. The optical imaging lens assembly according to claim 1, wherein $2.5<R2/R1<3.5$,
    where R2 is a radius of curvature of an image-side surface of the first lens, and R1 is a radius of curvature of the object-side surface of the first lens.

8. The optical imaging lens assembly according to claim 1, wherein $1.5<SAG11/SAG22<3.0$,
    where SAG11 is a distance along the optical axis from an intersection of the object-side surface of the first lens and the optical axis to a vertex of an effective radius of the object-side surface of the first lens, and SAG22 is a distance along the optical axis from an intersection of an image-side surface of the second lens and the optical axis to a vertex of an effective radius of the image-side surface of the second lens.

9. The optical imaging lens assembly according to claim 1, wherein $1.0<ET2/CT2<1.5$,
    where ET2 is an edge thickness of the second lens, and CT2 is a center thickness of the second lens along the optical axis.

10. The optical imaging lens assembly according to claim 1, wherein $2.0<CT1/CT2<3.5$,
    where CT1 is a center thickness of the first lens along the optical axis, and CT2 is a center thickness of the second lens along the optical axis.

11. An optical imaging lens assembly, sequentially from an object side to an image side of the optical imaging lens assembly along an optical axis, comprising:
    a first lens having positive refractive power;
    a second lens having positive refractive power and a convex object-side surface; and
    a third lens having negative refractive power,
    wherein $2.5<R2/R1<3.5$,
    where R2 is a radius of curvature of an image-side surface of the first lens, and R1 is a radius of curvature of an object-side surface of the first lens, and
    wherein $0.5<(CT1+CT2+CT3)/T23<1.5$,
    where CT1 is a center thickness of the first lens along the optical axis, CT2 is a center thickness of the second lens along the optical axis, CT3 is a center thickness of the third lens along the optical axis, and T23 is a spaced interval between the second lens and the third lens along the optical axis.

12. The optical imaging lens assembly according to claim 11, wherein the object-side surface of the first lens is convex, and the image-side surface thereof is concave.

13. The optical imaging lens assembly according to claim 11, wherein $TTL/f<1.0$,
    where TTL is a distance along the optical axis from the object-side surface of the first lens to an imaging plane of the optical imaging lens assembly, and f is an effective focal length of the optical imaging lens assembly.

14. The optical imaging lens assembly according to claim 11, wherein Semi-FOV>20°,
    where Semi-FOV is half of a maximum field-of-view of the optical imaging lens assembly.

15. The optical imaging lens assembly according to claim 11, wherein $f/EPD<2.6$,
    where f is an effective focal length of the optical imaging lens assembly, and EPD is an entrance pupil diameter of the optical imaging lens assembly.

16. The optical imaging lens assembly according to claim 11, wherein $1.0<f1/|f3|<1.5$,
    where f1 is an effective focal length of the first lens, and |f3| is an absolute value of an effective focal length of the third lens.

17. The optical imaging lens assembly according to claim 11, wherein $1.5<SAG11/SAG22<3.0$,
    where SAG11 is a distance along the optical axis from an intersection of the object-side surface of the first lens and the optical axis to a vertex of an effective radius of the object-side surface of the first lens, and SAG22 is a distance along the optical axis from an intersection of an image-side surface of the second lens and the optical axis to a vertex of an effective radius of the image-side surface of the second lens.

18. The optical imaging lens assembly according to claim 11, wherein $2.0 < CT1/CT2 < 3.5$,
where CT1 is a center thickness of the first lens along the optical axis, and CT2 is a center thickness of the second lens along the optical axis.

* * * * *